(12) United States Patent
Waller et al.

(10) Patent No.: US 12,179,924 B2
(45) Date of Patent: Dec. 31, 2024

(54) METHOD FOR PROCESSING IDENTIFICATIONS

(71) Applicant: Airbus Operations GmbH, Hamburg (DE)

(72) Inventors: Christian Waller, Hamburg (DE); Jan Mueller, Hamburg (DE); Uwe Schwark, Hamburg (DE); Bing Chen, Hamburg (DE); Wolfgang Fischer, Hamburg (DE); Christoph Tillack-Nieveler, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 485 days.

(21) Appl. No.: 17/511,674

(22) Filed: Oct. 27, 2021

(65) Prior Publication Data
US 2022/0135229 A1    May 5, 2022

(30) Foreign Application Priority Data

Oct. 29, 2020   (DE) .......................... 102020128551.5

(51) Int. Cl.
 *B64D 11/06*   (2006.01)
 *B64D 45/00*   (2006.01)
(52) U.S. Cl.
 CPC .............. *B64D 11/06* (2013.01); *B64D 45/00* (2013.01)
(58) Field of Classification Search
 None
 See application file for complete search history.

(56) References Cited

U.S. PATENT DOCUMENTS

| | | | |
|---|---|---|---|
| 9,076,195 B2* | 7/2015 | Mohammad | G06T 7/001 |
| 2009/0312897 A1 | 12/2009 | Jamrosz et al. | |
| 2010/0308166 A1 | 12/2010 | Bovelli et al. | |
| 2014/0361074 A1 | 12/2014 | Kumar et al. | |
| 2014/0380215 A1* | 12/2014 | Senesac | G06F 3/0484 715/771 |
| 2015/0269787 A1 | 9/2015 | Kumar et al. | |
| 2017/0199520 A1 | 7/2017 | Glatfelter | |
| 2017/0242676 A1 | 8/2017 | Frayssignes | |
| 2018/0293810 A1* | 10/2018 | Griffith | G07C 5/085 |
| 2018/0322714 A1 | 11/2018 | Gennotte | |

FOREIGN PATENT DOCUMENTS

EP    3241748 A1    11/2017

OTHER PUBLICATIONS

German Search Report; priority document.

* cited by examiner

*Primary Examiner* — Todd Melton
*Assistant Examiner* — Jason R Roberson
(74) *Attorney, Agent, or Firm* — Greer, Burns & Crain, Ltd.

(57) ABSTRACT

A method for processing previously detected identifications of apparatuses of an aircraft, wherein each apparatus has at least one communicative component. A reference dataset is used to compare the actual identifications with specified identifications, as a result of which a report signal based on the comparison result indicates whether the detected identifications correspond to the identifications represented by the reference dataset. If there is a positive match, this allows the conclusion that the apparatuses are correctly installed in the aircraft.

18 Claims, 8 Drawing Sheets

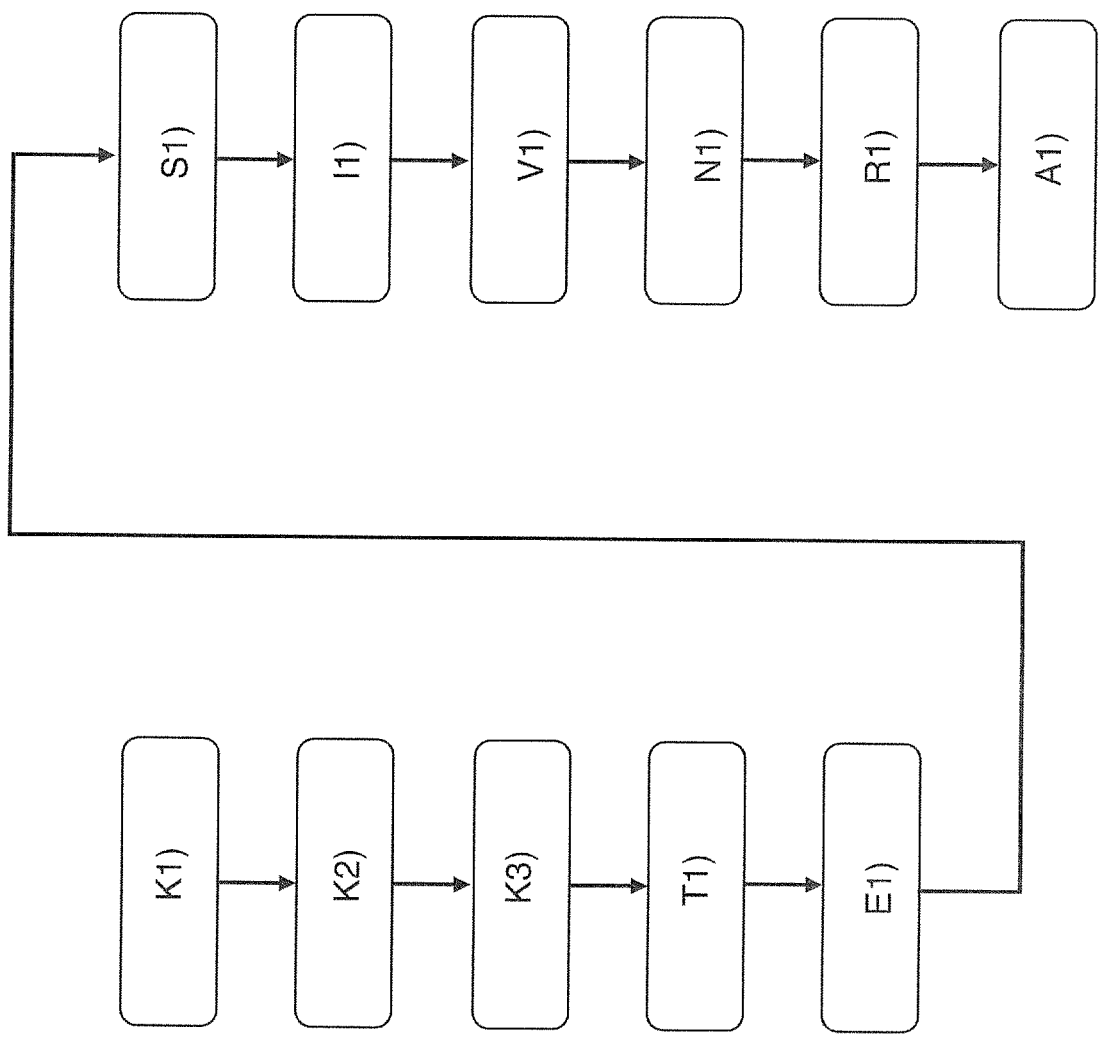

METHOD FOR PROCESSING IDENTIFICATIONS

CROSS-REFERENCES TO RELATED APPLICATIONS

This application claims the benefit of the German patent application No. 102020128551.5 filed on Oct. 29, 2020, the entire disclosures of which are incorporated herein by way of reference.

FIELD OF THE INVENTION

The invention relates to a method for processing previously detected identifications of apparatuses of an aircraft.

BACKGROUND OF THE INVENTION

Identifications are fundamentally known from the prior art. An identification is preferably understood to mean a designation or an identifier. The identification can be used for example to identify an object that bears the identification. However, it is also possible for an identification borne by an object to provide information about specific features of the object. As such, an identification can, for example, represent a type of the object or technical characteristics of the object. However, the identification may also have been used to determine other features that do not represent the object, but rather are connected to the object. Additionally, it is known from the prior art that aircraft can have a multiplicity of apparatuses that each have at least one communication-enabled component. The respective component may be designed to communicate with a server by way of a radio interface or a wired interface. Modern aircraft can have a multiplicity of apparatuses, each having at least one communication-enabled component. The communication-enabled components therefore need to be uniquely identifiable and addressable by the server in order to permit error-free communication with each of the components. If, for example, a seat in the passenger area of the aircraft forms an apparatus, with a seat occupancy sensor forming the communication-enabled component of this apparatus, then establishing the actual occupancy of the seats in the aircraft requires the respective related seat occupancy sensor of a multiplicity of the seats in the passenger area to be able to communicate uniquely with the server. The seat occupancy sensors of the multiplicity of seats in the aircraft are of the same type, however. In other words, they are usually of identical design.

SUMMARY OF THE INVENTION

The invention is based on an object of providing a method that can be used to establish whether it is possible to communicate uniquely with a multiplicity of communication-enabled components in an aircraft.

There is provision for a method that comprises at least steps T1), E1), S1), I1), V1) and N1). The steps are preferably performed in the order shown. In principle, however, it is possible for further steps or substeps to be performed between two of the steps. According to step T1) of the method, a configuration signal is transmitted from a terminal to a host system, wherein the configuration signal represents at least one principal dataset, and wherein each principal dataset represents precisely one related, unique apparatus identification of a respective apparatus of an aircraft and comprises, for this respective apparatus, at least one auxiliary dataset that is uniquely associated with in each case precisely one component of the respective apparatus. Additionally, there is provision for each auxiliary dataset to comprise a related, unique subscriber identification of the respective component, a non-unique piece-part identification of the respective component and an initial key identification, wherein the host system stores a reference dataset that comprises a multiplicity of apparatus identifications and at least one associated, non-unique reference piece-part identification for each apparatus identification. According to step E1), the configuration signal is received by means of the host system. According to step S1), the at least one principal dataset received by means of the configuration signal is stored by the host system. According to step I1), the apparatus identification of each principal dataset received by means of the configuration signal is identified in the reference dataset by means of the host system. Step I1) additionally comprises determining in the reference dataset, by means of the host system, the at least one non-unique reference piece-part identification related to the identified apparatus identification. According to step V1), the at least one piece-part identification comprised by the at least one auxiliary dataset of a respective principal dataset is compared with the at least one reference piece-part identification that was identified for the respective apparatus identification of the respective principal dataset in step I1). Preferably, step V1) is performed for each principal dataset. Finally, according to step N1), a report signal is generated and sent by means of the host system, as a result of which the report signal represents a result of the comparison from step V1).

An aircraft can comprise a multiplicity of apparatuses. An apparatus may be for example a seat from the passenger area of the aircraft or a cabinet from the galley of the aircraft. A further, possible apparatus of the aircraft is, for example, a subassembly from the toilet area of the aircraft. Other objects in the aircraft may also be an apparatus of the aircraft, however. Of particular interest in this case are the apparatuses of the aircraft that each have at least one component that is in the form of a communication-enabled component. Thus, where the text below refers to an apparatus of the aircraft, this means an apparatus having at least one component that is designed for radio communication or wired communication in each case. Preferably, each component forms a part of the respective associated apparatus. This is the case, in particular, if the apparatus comprises the at least one related component and also further elements. Each of these components of the apparatus can therefore be in the form of a communication component and/or comprise a unit that is designed for the communication, in particular the radio communication or wired communication. In an illustrative configuration, the apparatus may be completely formed by a related component. In this configuration, reference is still made to the apparatus and the component. In practice, it may be that multiple apparatuses each comprise communication-enabled components of identical design. As such, an aircraft may have for example multiple seats that each form an apparatus and each have a communication-enabled component, such as, for example, a communication-enabled seat occupancy sensor. The seat occupancy sensor can detect the occupancy of the seat by means of a sensor and can additionally transmit a sensor signal that represents the occupancy state of the respective seat. The seat occupancy sensors for the seats of the aircraft may be in identically designed form. The technical features, the shape and/or the type of each seat occupancy sensor may be represented by the same piece-part identification. For each communication-enabled component of an apparatus of the aircraft, there is therefore provision for a piece-part identification of the respective component. This piece-part identification is not unique to the respective component, since a plurality of components of identical design can have and/or bear the same piece-part identification. There is therefore provision for a related and unique subscriber identification to be additionally provided for each component. The subscriber identification can be for example a unique serial number, a unique MAC address or another unique identification that is uniquely associated with the respective component. The subscriber identification can be used to uniquely identify each component. For each component, there is additionally provision for an initial key identification. The initial key identification may be unique or non-unique. Preferably, the initial key identification is not unique, as a result of which all or a plurality of the components have the same associated non-unique initial key identification.

The production of an aircraft often involves a multiplicity of apparatuses being installed that each comprise at least one communication-enabled component. A unique apparatus identification related to the respective apparatus is therefore detected during production. The apparatus identification may be referred to and/or abbreviated to FIN. Additionally, for each communication-enabled component that forms a part of the apparatus, the respective related, unique subscriber identification, the related and non-unique piece-part identification and the related initial key identification are detected. The aforementioned identifications, that is to say, the apparatus identification, the subscriber identification, the piece-part identification and the initial key identification, can be detected, for example, by optically reading in columns of numbers, barcodes, QR codes. Detection can also be effected using nonoptical detection methods, however, for example using RFID tags that store the respective identification of the apparatus or the component. If an apparatus has multiple components, at least one barcode, QR code or RFID tag for each component may be attached to the respective component in order to allow the detection explained above. Special detection devices can be used for detection. However, it is also possible for detection to be effected by means of a specially configured mobile phone or tablet that has a camera. It is alternatively possible for a sticker having the apparatus identification to be arranged on each apparatus that comprises at least one communication-enabled component and for a further sticker comprising the subscriber identification, the non-unique piece-part identification and the initial key identification to be arranged on each of the communication-enabled components. The sticker can represent the identifications as optically detectable identifications or can comprise an RFID tag. The stickers are mentioned just purely by way of illustration, however. The respective identifications can also be made accessible by other means on the apparatus or the respective component. If the identifications are represented as optically detectable identifications on the respective sticker, the stickers can be removed and stuck to a sheet of paper again in an association, as a result of which the sheet of paper can subsequently be scanned in so as to detect the identification and the association of the applicable identifications.

The detection of the identifications by way of preconfigured, mobile devices, such as, for example, a specially configured mobile phone, or the detection of the identifications by way of retrospective scanning-in of paper ultimately gives rise to a configuration signal from a terminal to a host system, wherein the configuration signal represents at least one principal dataset. The terminal may be, for example, the specially configured mobile phone or a computer system having a paper scanner. The mobile phone and/or the computer system may each be designed to transmit the configuration signal. The principal dataset transmitted to the host system by way of the configuration signal represents, for each apparatus of the aircraft, precisely one related, unique apparatus identification and, for this respective apparatus, at least one auxiliary dataset that is uniquely associated with in each case precisely one component of the respective apparatus. The principal dataset can represent for example at least ten apparatus identifications that are each associated with precisely one apparatus of the aircraft. This can be the case, for example, if the aircraft has a multiplicity of seats having seat occupancy sensors. In this case, the principal dataset can represent precisely one related, unique apparatus identification for each of ten seats of the aircraft. Each of the seats can have the seat occupancy sensor as a communication-enabled component, for example. There is therefore also provision for each principal dataset to comprise at least one auxiliary dataset for each apparatus identification. Each apparatus therefore has at least one associated auxiliary dataset, preferably multiple associated auxiliary datasets. As a result of each apparatus additionally having precisely one uniquely associated apparatus identification, there is also a unique association between the apparatus identifications and the one or more auxiliary datasets. The number of auxiliary datasets associated with an apparatus corresponds to a number of communication-enabled components of the respective apparatus. Each auxiliary dataset is therefore uniquely associated with in each case precisely one communication-enabled component of the respective apparatus. If a seat has not only the seat occupancy sensor but also a further sensor or further object as a communication-enabled component, then the respective seat can have two associated auxiliary datasets that are each uniquely associated with precisely the relevant sensor or object of the seat. One of the auxiliary datasets may therefore be associated with the seat occupancy sensor and the other auxiliary dataset may be associated with the further sensor or object of the same seat. Each auxiliary dataset comprises a related, unique subscriber identification. This unique subscriber identification may also be referred to and understood as an identification subscriber identification. The unique subscriber identification can thus be used to uniquely identify the respective related component. Each auxiliary dataset associated with precisely one communication-enabled component of an apparatus additionally comprises a non-unique piece-part identification of the respective component and an initial key identification. The non-unique piece-part identification can provide information about the type of the respective component, the category of the respective component or a component group of the respective component. The initial key identification may be for example a certificate, a digital key or an access key for encrypted communication, in particular encrypted radio communication. The initial key identification can preferably be used to make an encrypted communication connection to the host system.

When an aircraft is produced, it is known beforehand which apparatuses and which related, communication-enabled components for the apparatuses are used. A related, unique apparatus identification is therefore known for each of the apparatuses and at least one associated, non-unique reference piece-part identification is known for each component of each apparatus. On the basis of these known identifications, it is possible for the host system to store a reference dataset. The reference dataset comprises a multiplicity of apparatus identifications. A respective related apparatus identification may therefore be stored by the reference dataset for every apparatus that needs to be installed in the aircraft. The reference dataset additionally comprises at least one associated, non-unique reference piece-part identification for each apparatus identification. The reference piece-part identification may be a specified value for the piece-part identification. If an apparatus identification from the reference dataset identifies a seat for an aircraft, for example, then the non-unique reference piece-part identification associated with the respective apparatus identification can for example represent the specified type of the seat occupancy sensor of the seat. The non-unique reference piece-part identification does not require a seat occupancy sensor precisely identified beforehand to be used for the respective seat. However, the non-unique reference piece-part identification can determine that the seat occupancy sensor to be used for the seat should be of a specific type. If the seat for the aircraft is supposed to have multiple, for example two, electrical communication-enabled sensors, then the apparatus identification from the reference dataset for this seat may have not just one but rather for example two associated non-unique reference piece-part identifications. If the sensors are supposed to be of a different type, then the reference piece-part identifications will likewise differ. The reference dataset stored by the host system can thus reveal, for each apparatus identification of an apparatus that needs to be installed for the aircraft, the at least one associated, non-unique reference piece-part identification for the respective related component of the apparatus that needs to be installed. To this end, the host system can be adapted accordingly.

Each principal dataset preferably represents a unique apparatus identification provided by the apparatus and detected. Each principal dataset is generated by detecting the actual identifications on the respective apparatus and the at least one related component. Each principal dataset thus indicates the unique apparatus identification actually associated for the respective apparatus. For each communication-enabled component of the apparatus, the principal dataset additionally comprises the identifications of the auxiliary dataset for the respective component, wherein the identifications of the auxiliary dataset are preferably likewise detected on the components of the apparatus or on the apparatus itself by means of a sensor. They are thus the actual identifications for the respective component of the actual apparatus.

The receiving of the configuration signal transmits the at least one principal dataset to the host system. The at least one principal dataset is additionally stored by the host system. The host system therefore has the reference dataset and at least one principal dataset available.

For each apparatus having at least one communication-enabled component of the aircraft, there is thus at least one principal dataset stored by the host system. An apparatus identification and at least one reference piece-part identification for each apparatus of the aircraft are additionally provided in the reference dataset.

In step I1), the host system identifies the apparatus identification of each principal dataset in the reference dataset, as a result of which the host system additionally determines the at least one related, non-unique reference piece-part identification in the reference dataset in the process by reading. This thus establishes which at least one reference piece-part identification should exist for an apparatus identification of the principal dataset. Next, there follows in step V1) a comparison between the at least one identified reference piece-part identification and the at least one actual piece-part identification comprised by the at least one auxiliary dataset of the respective principal dataset. Preferably, step V1) is performed for each principal dataset. The comparison between the reference piece-part identifications and the actual piece-part identifications is used for checking purposes. The comparison may show for example that the reference piece-part identification associated with an apparatus identification corresponds to the actual piece-part identification associated with the same apparatus identification. If there is provision for multiple communication-enabled components for the applicable apparatus, the comparison can also be made between the plurality of reference piece-part identifications and the actual piece-part identifications. If the apparatus identification indicates a seat for an aircraft, for example, then the related reference piece-part identifications can, for example, determine two different types of sensors for the seat. If applicable types of sensors have been installed on a seat that bears the apparatus identification when the aircraft is being produced, then the piece-part identifications for the sensors of the seat should correspond to the reference piece-part identifications. The comparison thus shows whether the reference piece-part identifications and the actual piece-part identifications correspond and hence the correct types of sensors are installed in the respective seat. The comparison can ultimately represent a match. If the actual piece-part identifications associated with an apparatus identification are different from the reference piece-part identifications associated with the same apparatus identification, then a difference arises between the actual piece-part identifications and the reference piece-part identifications. In this case, the comparison in step V1) can ultimately represent a difference or a non-match in the reference piece-part identifications and piece-part identifications.

When the aircraft is being produced, it is often already desirable to know whether the correct components are installed in an apparatus of an aircraft. There is therefore also a need to provide a match or a non-match as the result of the comparison from step V1) and/or to transmit the match or non-match to a higher-level unit. The method therefore provides for a report signal to be generated and sent by means of the host system in step N1), as a result of which the report signal represents the result of the comparison from step V1). It is thus possible after production of the aircraft or even while the aircraft is being produced to see from the report signal whether the apparatuses installed in the aircraft that each have communication-enabled components are installed correctly. In the event of errors, rapid and safe correction using the correct communication-enabled components can take place.

After the respective comparison has been performed for all principal datasets, the host system can additionally be used to establish whether one of the apparatus identifications and/or one of the reference identifications was not used for one of the comparisons. If at least one of the identifications of the reference dataset was not used for one of the comparisons, the report signal can additionally comprise the information that at least one of the identifications of the apparatuses and/or at least one of the identifications of the components was not detected.

Even though the explanations above have often been presented on the basis of an example in connection with a seat and related sensors, the explanations above apply in an analogous manner to any apparatuses of the aircraft if each apparatus has at least one communication-enabled component. The communication-enabled components are additionally not restricted to sensors. There may also be provision for other electronic and communication-enabled components in an apparatus that are not necessarily in the form of a sensor. Each of these components preferably has a communication unit in order to make a communication connection to the host system or a communication system of the aircraft. In this case, there is preferably provision for each communication unit to be in the form of a radio unit in order to make a radio connection to the host system and/or the communication system of the aircraft.

The method explained above is preferably used when an aircraft is being produced. However, it is also possible for the method to be used for example when repairing or replacing an apparatus of the aircraft. If for example an apparatus of an aircraft is faulty, the apparatus comprising at least one communication-enabled component, then the method can comprise transmitting the configuration signal to the host system in step T1), wherein the communication system comprises a principal dataset, and preferably precisely one principal dataset. This principal dataset can represent a unique apparatus identification for the newly installed apparatus of the aircraft and can additionally comprise a respective auxiliary dataset for each communication-enabled component of this new apparatus. The reference dataset stored in the host system can comprise an apparatus identification for this newly installed apparatus. Additionally, the reference dataset for each communication-enabled component of the newly installed apparatus can comprise a respective non-unique reference piece-part identification. Steps I1) to N1) can be performed in an analogous manner to that explained above. In the event of a repair to an aircraft that involves the apparatus being replaced, the method can therefore be applied in an analogous manner. The method is therefore suitable for use both when producing an aircraft and when repairing or maintaining an aircraft.

One advantageous configuration of the method is distinguished in that in step V1) the host system is used to check whether the piece-part identifications and reference piece-part identifications to be compared with one another match. Additionally, there is preferably provision for the report signal to be generated by means of the host system in step N1) in such a way that the result represents a positive match if the check from step V1) shows no differences, and otherwise indicates the differing identifications by means of the report signal. If the check from step V1) shows no differences between the piece-part identifications and reference piece-part identifications to be compared, for example, then the report signal can represent an "ok" as a positive match, for example, or can represent a predetermined code indicating the positive match. Otherwise, there is preferably provision for the report signal to indicate the differing identifications, for example by virtue of the differing piece-part identification being indicated by a letter code and/or numerical code. The differing piece-part identification can alternatively be indicated by the plain text of the respective differing piece-part identification. It is, therefore, particularly easy to see from the report signal whether the correct communication-enabled components have been installed for the apparatuses of the aircraft, or whether there were errors while the communication-enabled components for the apparatuses were being installed. If this is the case, the applicable piece-part identification for the respective component can be seen from the report signal, as a result of which simple correction by replacing the respective, communicative component is possible. Additionally, the report signal can identify the apparatus identification of the apparatus that comprises the component having the indicated subscriber identification. This can make it easier to find the respective apparatus with the erroneously installed component in practice.

One advantageous configuration of the method is distinguished in that the configuration signal represents multiple principal datasets. This is the case, for example, if multiple apparatuses are installed in the aircraft and the configuration signal is transmitted from a terminal to the host system subsequently, after the apparatuses are installed in the aircraft. The terminal, in this case, may be formed by a computer system having a scanner that detects the apparatus identifications and the identifications of the respective auxiliary datasets and generates multiple principal datasets therefrom, which are transmitted to the host system by means of the configuration signal. In an analogous manner, this is, however, also possible with a mobile terminal that is formed by a specially configured mobile phone having a camera, for example. This mobile terminal can be used to detect the multiple apparatus identifications and the identifications of the multiple auxiliary datasets while the plurality of apparatuses are being installed in the aircraft. Next, after the mobile terminal has made a communication connection to the host system, the transmission of the configuration signal can start, in order to transmit the multiple principal datasets to the host system. The host system may be a fixed host system. The host system may be in a separate form from the aircraft. However, it is also possible for the host system to be comprised by the aircraft or for a part of the aircraft to be associated with the host system.

A further advantageous configuration of the method is distinguished in that the terminal is a fixed terminal having a paper scanner. Stickers on the apparatuses and the communication-enabled components can be removed while the apparatuses are being installed in the aircraft, and then stuck to a sheet of paper in an orderly, predetermined manner. Next, the sheet of paper can be scanned in by means of the paper scanner. As a result, the fixed terminal can be used to generate multiple principal datasets. The terminal is additionally designed to generate and transmit the configuration signal to the host system, wherein the configuration signal represents the multiple principal datasets.

A further advantageous configuration of the method is distinguished in that the terminal is a mobile terminal. The mobile terminal may be formed, for example, by a mobile phone having a camera or a tablet having a camera. However, it is also possible for other mobile terminals having a camera to be used as mobile terminals that are designed to make a communication connection to the host system. Each mobile terminal may be designed, for example, to optically detect the apparatus identifications and the identifications of the components. Additionally, each mobile terminal may be designed to generate the principal dataset and to transmit the principal dataset by means of the configuration signal. Following the installation of each apparatus, the principal datasets can be transmitted to the host system by way of a respective configuration signal. The mobile terminal may, however, also be designed to store the applicable number of principal datasets while multiple apparatuses are being installed and to start the transmission of the configuration signal that represents the multiple principal datasets after the installation of the plurality of apparatuses has concluded.

A further advantageous configuration of the method is distinguished in that the mobile terminal has a camera, the method additionally comprising the following steps K1), K2) and K3), which are performed before step T1) of the method. Steps K1), K2) and K3) can be performed in the order indicated. According to step K1), an apparatus identification on an apparatus is, directly or indirectly, optically detected by means of the terminal. According to step K2), a subscriber identification, a non-unique piece-part identification and an initial key identification on each component of the apparatus from step K1) are, directly or indirectly, optically detected by means of the terminal. According to step K3), the principal dataset is generated for each apparatus from the related apparatus identification detected in step K1) and the at least one related auxiliary dataset with the identifications detected in step K2), by means of the terminal. The apparatus identification of an apparatus of the aircraft and the identifications of the components of this apparatus can be detected optically by means of the terminal. The identifications can be optically detected, for example by means of barcodes, line codes or in plain text on applicable stickers on the apparatus and/or the components. The terminal can have a camera or another optical reader in order to detect the identifications of the apparatuses and of the components. When the apparatus identification for the apparatus and each of the identifications of the at least one component are detected optically by means of the terminal, the terminal generates the principal dataset for the respective apparatus in step K3). This principal dataset comprises the unique apparatus identification for the respective apparatus and, for each communication-enabled component of the apparatus, a respective applicable auxiliary dataset that comprises a unique subscriber identification, a non-unique piece-part identification and an initial key identification in each case. The terminal is additionally designed to transmit the configuration signal comprising the at least one principal dataset generated in step K3) to the host system. In practice, the mobile terminal may be formed, for example, by a specially configured mobile phone having a camera. When the aircraft is being produced, people can use the mobile terminal to optically detect the identifications of the apparatuses and of the components by means of the camera. In this manner it is possible to generate a unique, digital association by way of the identifications from the communication-enabled components to an apparatus in the respective principal dataset.

A further advantageous configuration of the method is distinguished in that the mobile terminal has a near-field reader, the method additionally comprising the following steps K1), K2) and K3), which are performed before step T1). Steps K1), K2) and K3) can be performed in the order indicated. According to step K1) of this configuration of the method, an apparatus identification on an apparatus is, directly or indirectly, electromagnetically detected by means of the terminal. According to step K2) of this advantageous configuration of the method, a subscriber identification, a non-unique piece-part identification and an initial key identification on each component of the apparatus from step K1) are, directly or indirectly, electromagnetically detected by means of the terminal. According to step K3) of this advantageous configuration of the method, the principal dataset is generated for each apparatus from the related apparatus identification detected in step K1) and the at least one related auxiliary dataset with the identifications detected in step K2), by means of the terminal. For steps K1), K2) and K3), reference is made to the preceding explanations, preferred features, effects and/or advantages for the corresponding steps K1) to K3) of the preceding, advantageous configuration of the method in an analogous manner. According to the more recently mentioned, advantageous configuration of the method, the identifications are detected not optically, however, but rather by means of a near-field reader of the mobile terminal. Each apparatus and each related, communication-enabled component can have an electrical circuit, in particular a sticker having an electrical circuit of this kind, that is designed to interact with the near-field reader. The electrical circuit can store at least one identification. The near-field reader is preferably in the form of a so-called NFC reader (NFC stands for near-field communication) or in the form of an RFID reader (RFID stands for radio-frequency identification). In particular, the near-field reader may be designed to communicate with an NFC transponder or an RFID transponder by means of electromagnetic interaction. The transponder may also be referred to as and/or in the form of a tag. The identifications are therefore detected contactlessly by means of electromagnetic interaction between the near-field reader and the respective circuit. Each of the identifications of the apparatuses and of the communication-enabled components may therefore be stored by a respectively related circuit and be readable by means of electromagnetic interaction. Each electrical circuit may be formed by an NFC or RFID tag, in particular an electromagnetically communicative sticker having the NFC or RFID tag. The stickers may also be in the form of so-called NFC tag stickers, which each store at least one identification and the identification of which is readable in each case by the near-field reader of the terminal by means of contactless, electromagnetic communication. Each apparatus can have a uniquely related NFC tag attached to it and each component can likewise have a uniquely related NFC tag attached to it, in particular, stuck to it as part of a respective sticker.

A further advantageous configuration of the method is distinguished in that in step T1) at least one principal dataset is transmitted from the terminal to the host system in each of multiple, successive time windows. The multiple principal datasets represented by the configuration signal thus do not necessarily have to be transmitted as a coherent data block by means of the configuration signal. Rather, it is also possible for each principal dataset to be transmitted in a related time window, and hence for the multiple principal datasets to be transmitted in multiple, successive time windows, from the terminal to the host system by means of the configuration signal. As such, the principal datasets can, for example, each be sent to the host system after respective generation by means of the mobile terminal. However, it is also possible for the principal datasets to be generated for all apparatuses first, and then transmitted to the host system by means of the configuration signal in succession without temporal interruption between the time windows.

One advantageous configuration for the method is distinguished in that the terminal has a first signal interface and the host system has a second signal interface, the signal interfaces being designed to transmit a signal. The signal can be transmitted by radio or by wire. Each of the first and/or second signal interface can therefore be in the form of a radio signal interface or in the form of a wired signal interface. The signal to be transmitted can be, for example, the configuration signal and/or the report signal transmitted between the terminal and the host system.

A further advantageous configuration of the method is distinguished in that the terminal has a display and the first signal interface is designed to receive the report signal, and wherein the method additionally comprises steps R1) and A1). According to step R1), the report signal is received by means of the first signal interface of the terminal. According to step A1), a message, which optically represents the result of the comparison from step V1), is displayed on the basis of the report signal and by means of the display of the terminal. Following the optical detection of the identifications for the apparatuses and the communication-enabled components, the principal datasets are transmitted to the host system by way of the configuration signal, as a result of which the host system can be used to identify the apparatus identifications in the reference dataset and to compare the reference piece-part identifications read in the process with the actual piece-part identifications. The report signal generated by the host system preferably indicates whether the result of the comparison represents a positive match, or whether the check indicates differences between the identifications. The applicable report signal is thus transmitted from the host system to the mobile terminal. This can be accomplished by using the first and second signal interfaces. The report signal received by the terminal can therefore be used to display the message on the display of the terminal. The message can indicate whether the result of the check represents a positive match, or whether there were differences between the reference piece-part identifications and the actual piece-part identifications. The user of the terminal is therefore provided with the information about whether the apparatuses having the related, communication-enabled components have been installed in the aircraft in the predetermined manner provided for in accordance with the reference dataset.

A further advantageous configuration of the method is distinguished in that the first interface and the second interface are each in the form of a radio interface, the configuration signal being transmitted as a radio configuration signal in step T1), and the report signal being sent as a radio report signal in step N1). The radio transmission between the first and second interfaces allows the terminal to be in the form of a mobile terminal. The mobile terminal can transmit the principal datasets to the host system by radio by means of the configuration signal in each case after generating the respective principal dataset. The host system can be designed such that steps I1) and V1) are performed individually for each received principal dataset, as a result of which an applicable report signal is returned to the mobile terminal for each received principal dataset. This is advantageous, in particular, when the aircraft is being repaired, maintained and/or produced, since in this manner it is possible to establish directly in situ whether the most recently installed apparatus for the aircraft is installed correctly.

A further advantageous configuration of the method is distinguished in that the method additionally comprises steps H1), Z1) and W1). According to step H1), a radio signal connection is made from a third radio signal interface of a component of an apparatus of an aircraft to the second radio signal interface of the host system, wherein a memory unit of the respective component stores the related, unique subscriber identification of the respective component, a non-unique piece-part identification of the respective component and an initial key identification, and wherein the radio signal connection is encrypted by means of the initial key identification. According to step Z1), a new key identification is assigned and transmitted from the host system to the component by way of the radio signal connection. According to step W1), a new radio signal connection, encrypted by means of the new key identification, is remade from the third radio signal interface of the component to the second radio signal interface of the host system.

Steps H1), Z1) and W1) are thus performed after the apparatus is installed in the aircraft. Previously, the terminal was used to check whether the apparatus and the related, communication-enabled components are installed correctly. The initial key identification can be used by the respective component to make a radio connection to the host system. The initial key identification is not unique, however. Therefore, there follows in step Z1) the transmission of a new key identification and in step W1) the remaking of a radio signal connection, encrypted by means of the new, most recently received key identification, from the respective component to the host system. The new key identification is preferably a unique key identification associated only with the respective component, which means that the radio signal connection, encrypted by way of the new key identification, between just the respective component and the host system is tap-proof.

A further advantageous configuration of the method is distinguished in that the method additionally comprises steps R1) and R2). According to step R1), a reset signal is received by way of the third radio signal interface of the component or a pushbutton switch of the component. According to step R2), the key identification is reset to the initial key identification stored in the memory unit of the component. Thus, when a component receives for example a reset signal that is brought about either by way of the radio signal interface of the respective component or by way of a pushbutton switch of the component, the respective component can reset the key identification to the initial key identification, and thus reject the new key identification received in step Z1). Steps R1) and R2) allow a component to be reset again if it was inadvertently installed incorrectly, and then to be used as in the case of the original use and, in the process, to be provided with a suitable, new key identification for secure radio communication with the host system.

BRIEF DESCRIPTION OF THE DRAWINGS

Further features, advantages and possible uses of the present invention will emerge from the description of the exemplary embodiments that follows and from the figures. Here, all of the features described and/or illustrated in the figures form the subject matter of the invention individually and in any desired combination, even independently of the combination of the features in the individual claims or the back-references thereof. Furthermore, in the figures, the same reference signs are used for identical or similar objects.

FIGS. 6-8 each show a schematic flowchart for an advantageous configuration of a method.

DETAILED DESCRIPTION OF THE PREFERRED EMBODIMENTS

Figure 1:
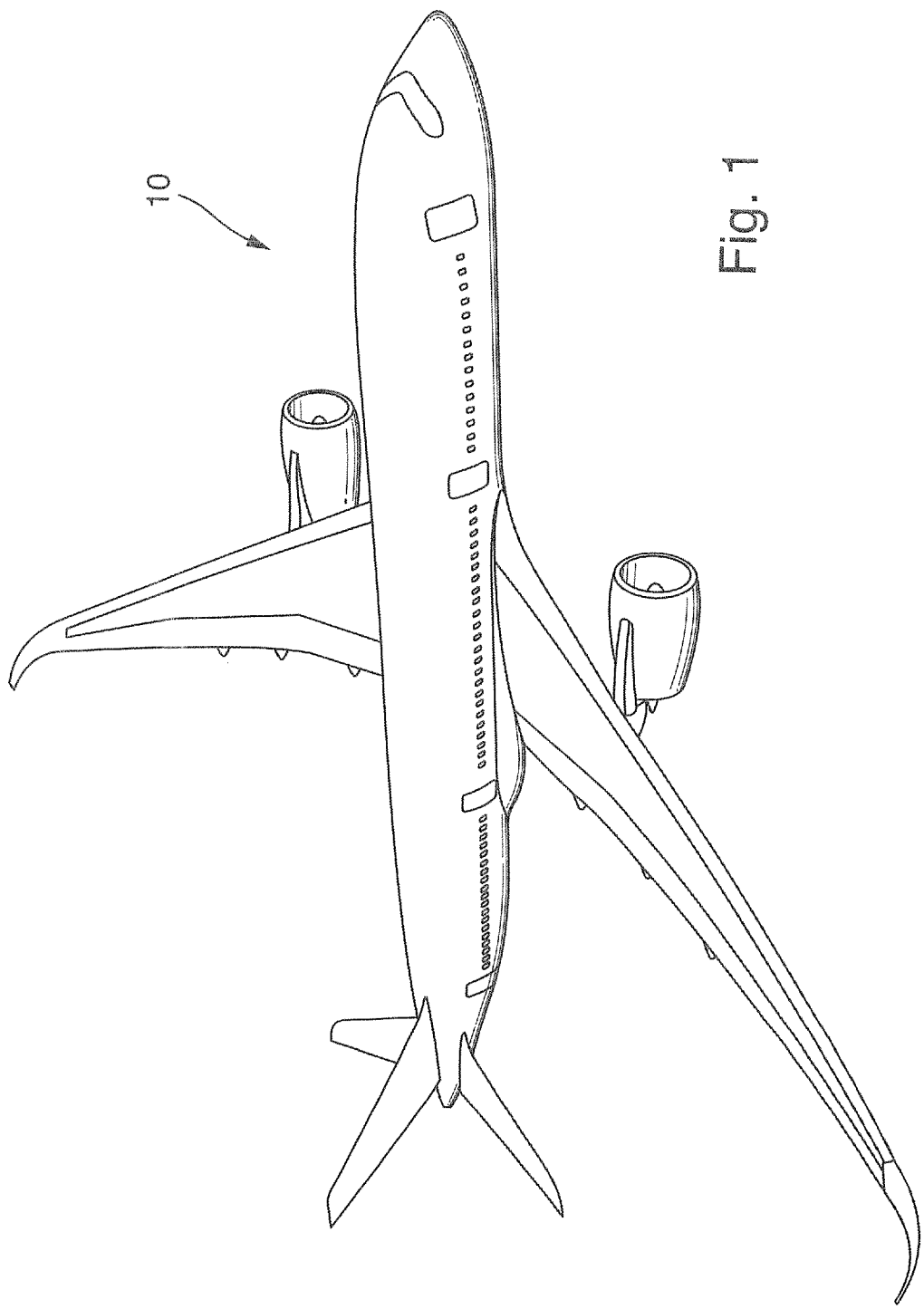
FIG. 1 shows a schematic perspective view of an advantageous configuration of an aircraft.

FIG. 1 schematically depicts an aircraft 10. Modern aircraft 10 often have a multiplicity of apparatuses 8, such as, for example, seats or cabinets of a galley 32.

Figure 2:
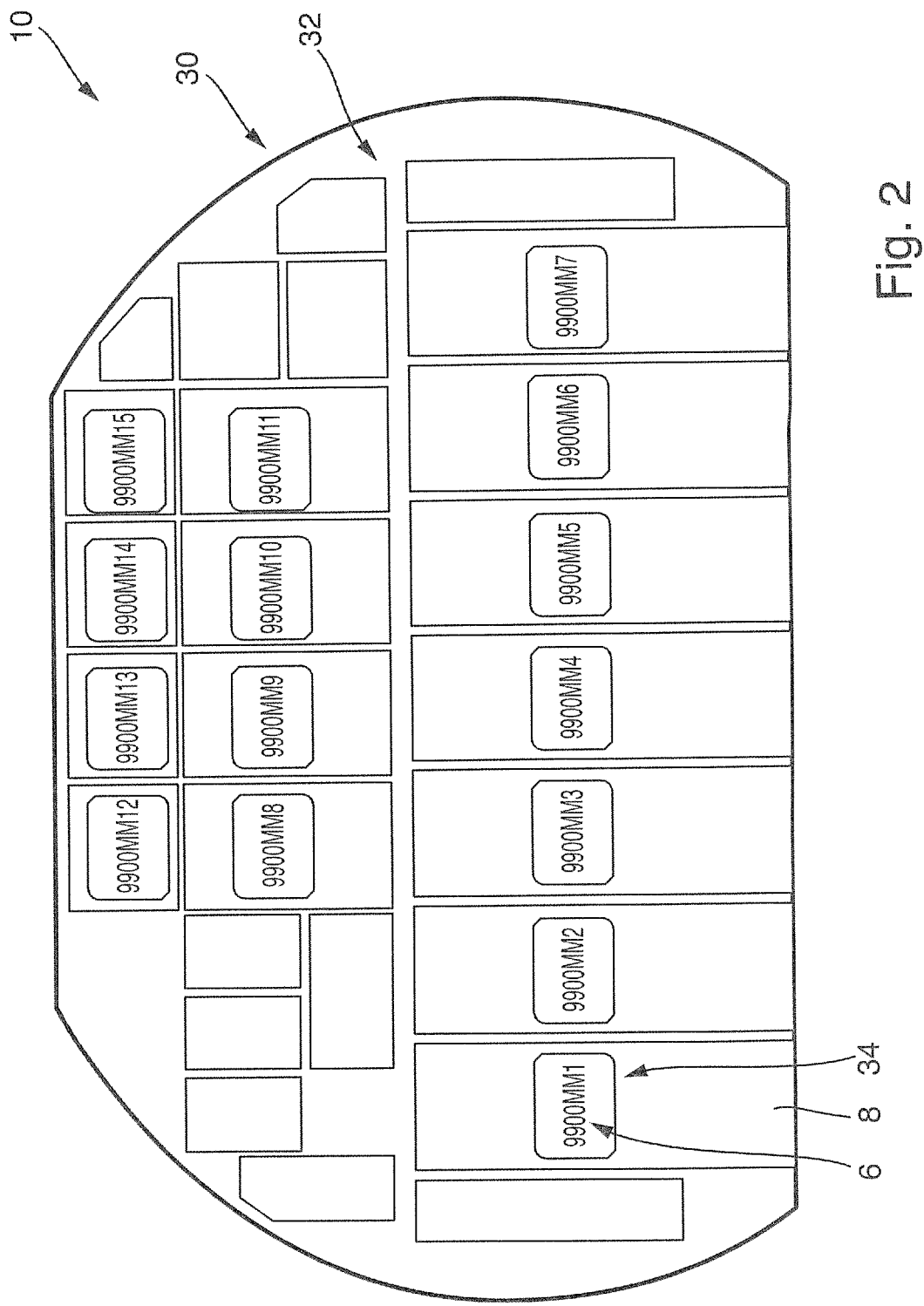
FIG. 2 shows a schematic depiction of an advantageous configuration of a design of galley cabinets in an aircraft.

FIG. 2 reproduces a portion of the fuselage 30 of the aircraft 10 in a schematic cross-sectional representation. FIG. 2 shows multiple cabinets of a galley 32. Several of the cabinets are each provided with an apparatus sticker 34 that reproduces an apparatus identification 6 for the respective cabinet. Cabinets that have an apparatus sticker 34 with a related apparatus identification 6 form examples of an apparatus 8 for the purposes of the invention. These apparatuses 8 can differ from the usual cabinets (without an apparatus identification 6) by virtue of each of the apparatuses 8 having at least one component 12 that is designed to make a communication connection, in particular, a radio connection or a wired communication connection. Such components 12 are also referred to as communication-enabled components 12.

Figure 3:
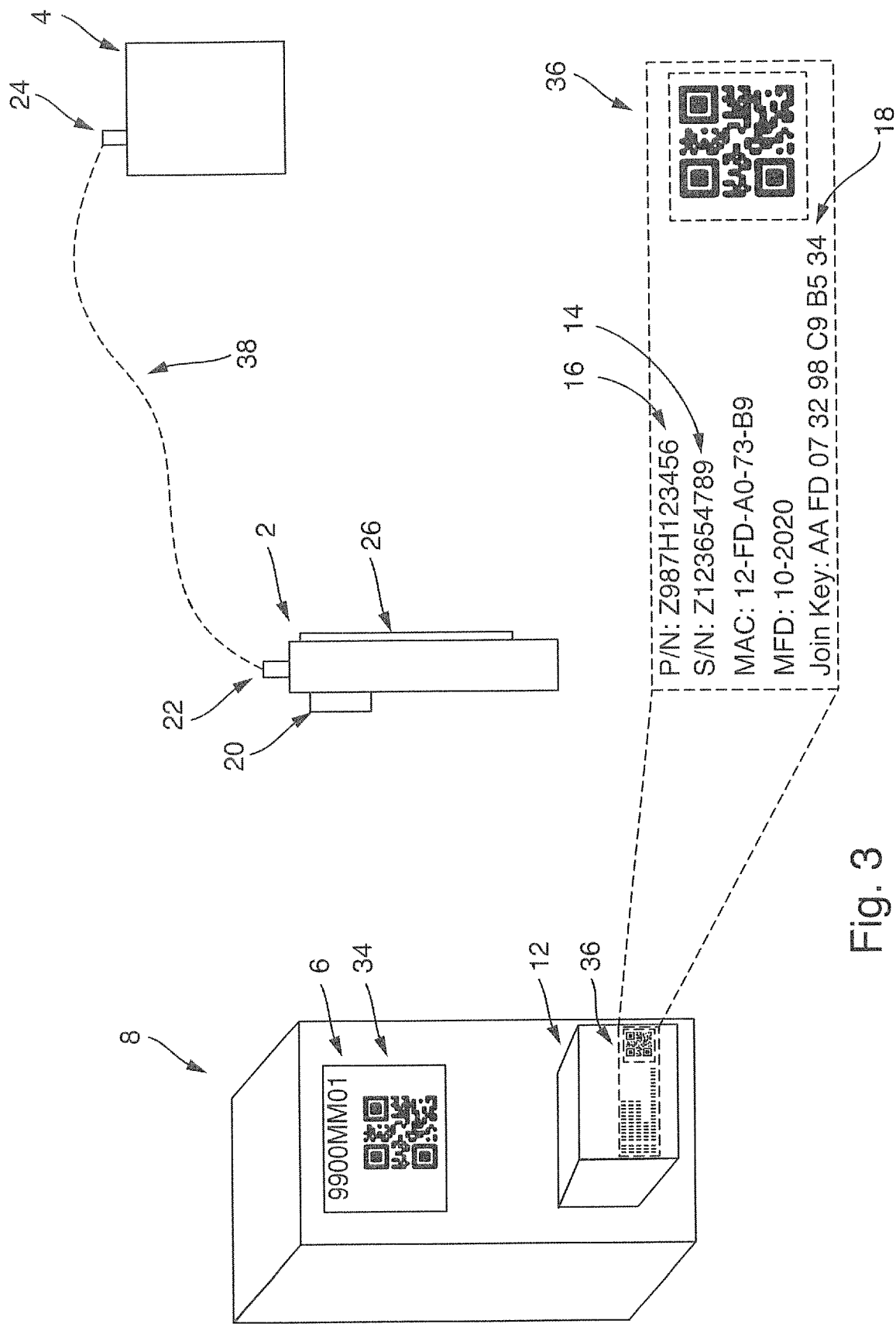
FIG. 3 shows a schematic depiction of advantageous configurations of a terminal, a host system and an apparatus for an aircraft.

FIG. 3 schematically depicts an advantageous configuration of the apparatus 8. The outer side of the apparatus 8 has an apparatus sticker 34 on which the apparatus identification 6 is represented firstly by a combination of numbers and letters and secondly by a QR code. The apparatus identification 6 can thus be reproduced by the apparatus sticker 34 in two ways, namely once in a manner encoded by the QR code and once in plain text through the combination of numbers and letters. In principle, it is possible for one of the two manners of reproduction, that is to say either the QR code or the combination of numbers or letters, to be sufficient to associate the apparatus identification 6 with the apparatus 8.

It can additionally be seen from FIG. 3 that the communication-enabled component 12 forms a part of the apparatus 8. The communication-enabled component 12 can form a modular component of the apparatus 8. However, it is also possible for the communication-enabled component 12 to be a component of the apparatus 8 that is permanently connected to the apparatus 8 or for it to form an integral part of the apparatus 8. An outer side of the communicative component 12 has had a component sticker 36 applied to it. The component sticker 36 is depicted in magnified form to the side of the communication-enabled component 12 in FIG. 3. The magnified depiction of the component sticker 36 shows that the component sticker 36 reproduces multiple identifications 14, 16, 18, which are thereby also associated with the communication-enabled component 12. The component sticker 36 therefore associates a related, unique subscriber identification 14, a non-unique piece-part identification 16 and an initial key identification 18 with the communication-enabled component 12. The subscriber identification 14 may also be referred to as a client ID or as an S/N. The piece-part identification 16 may also be referred to as a client part No. The initial key identification 18 may also be referred to as a join key, pre-shared key, key or certificate.

The apparatus identification 6 is unique to each apparatus 8. The apparatus identification 6 can therefore be used to uniquely identify the apparatus 8. For each communication-enabled component 12 of an apparatus 8, there is provision for a respective related, unique subscriber identification 14. The subscriber identification 14 can therefore be used to uniquely identify the respective component 12. Each component 12 additionally has the associated piece-part identification 16. The piece-part identification 16 can provide information about the type, the category, the group or other, general technical features of the respective component 12. Since the piece-part identification 16 is not unique, the piece-part identification 16 cannot be used to uniquely identify the component 12. Preferably only the subscriber identification 14 is suitable for this. The piece-part identification 16 is, however, suitable for establishing what technical features the respective component 12 has and/or what technical specifications the respective component 12 meets. In particular, the piece-part identification 16 can be used to determine the nature and/or the type of the respective component 12. The piece-part identification 16 can specify a communicative moisture sensor, for example. Multiple cabinets in the galley 32 of the aircraft 10 may be designed to have a communicative moisture sensor, as a result of which these cabinets each form an apparatus 8 that comprises a communication-enabled component 12, namely the communicative moisture sensor. The communicative moisture sensor is not the only example of a communication-enabled component 12 in the galley 32, however. As such, other electrical appliances may also be arranged in a cabinet of the galley 32 and additionally designed to make a communication connection. As such, a further cabinet can, for example, form an apparatus 8 if this cabinet has, as a communication-enabled component 12, a coffee machine that is likewise designed to make a communication connection. Each of the components 12 of the multiple apparatuses 8 may be designed to make a communication connection to the same communication unit of the aircraft 10. This communication unit can, for example, be the host system 4 if the host system is part of the aircraft 10. Otherwise, a different communication unit of the aircraft 10 may be designed to make the communication connection to the communication-enabled components 12.

The planning stage for producing an aircraft 10 often involves stipulating the location at which apparatuses 8 with related components 12 need to be installed. For an advantageous configuration of the method of the invention, there is provision for the installation of the apparatuses to involve a mobile terminal 2 being used that is designed to directly or indirectly optically detect the apparatus identification 6, the subscriber identification 14, the piece-part identification 16 and the initial key identification 18. FIG. 3 depicts the mobile terminal 2 by way of illustration as a specially configured mobile phone that has a camera 20 and a display 26. The display 26 may be formed by a screen, for example. The camera 20 and the display 26 may be arranged on opposite outer sides of the mobile terminal 2. Additionally, the mobile terminal 2 can have a first signal interface 22 that is used to make a signal connection 38, in particular a radio signal connection 38, to a second signal interface 24 of the host system 4. When apparatuses 8 are installed in the galley 32 of the aircraft 10, for example, the mobile terminal 2 can be used to photograph the apparatuses 8 in succession by means of the camera 20 of the mobile terminal 2 and in this manner to optically detect the aforementioned identifications 6, 14, 16, 18. From these identifications, the mobile terminal 2 forms at least one principal dataset, which the mobile terminal 2 conveys to the host system 4 in the form of a configuration signal by way of the signal connection 38.

Preferably precisely one related principal dataset is generated for each apparatus 8. The mobile terminal 2 may be appropriately configured for this purpose. Each principal dataset is formed in such a way that each principal dataset represents precisely one related, unique apparatus identification 6 of the respective apparatus 8 of the aircraft 10 and, for this respective apparatus 8, comprises at least one auxiliary dataset that is uniquely associated with in each case precisely one component 12 of the respective apparatus 8. The principal dataset thus comprises the related apparatus identification 6 unique to the apparatus 8 and, for each communication-enabled component 12 of this apparatus 8, a respective related auxiliary dataset. If an apparatus 8 has two communication-enabled components 12, for example, then the principal dataset will have the apparatus identification 6 unique to the apparatus 8 and two auxiliary datasets, each auxiliary dataset being uniquely and precisely associated with only one of the two communication-enabled components 12. Each auxiliary dataset comprises a related, unique subscriber identification 14 of the respective component 12, a non-unique piece-part identification 16 of the respective component 12 and an initial key identification 18. The initial key identifications 18 are likewise not unique to the respective component 12. Rather, the initial key identifications 18 for the multiple components 12 may be the same. Although the non-unique piece-part identifications 16 may be the same, they do not have to be. If the apparatus 8 has two different types of communicative sensors as communication-enabled components 12, for example, then the piece-part identifications 16 will likewise differ in this case.

The transmission of each principal dataset from the mobile terminal 2 to the host system 4 by the configuration signal conveys the information about the installed apparatus 8 and the related, communication-enabled components 12 to the host system 4.

Before the actual production of the aircraft 10, it is often stipulated which apparatuses 8 are supposed to be used for the aircraft 10, and which communication-enabled components 12 the respective apparatuses 8 are supposed to have. The apparatus identifications 6 may already be predetermined for the apparatuses 8. For the communication-enabled components 12 of a respective apparatus 8, there is additionally preferably provision for a piece-part identification 16 and a so-called reference piece-part identification to be predetermined for each of these related communication-enabled components 12. Against this background, the host system 4 stores a reference dataset that comprises a multiplicity of apparatus identifications 6 and at least one related, non-unique reference piece-part identification for each apparatus identification 6. Each of the reference piece-part identifications can be understood as a specified value for the actual piece-part identification 16 of a component 12 that is installed and/or integrated in the apparatus 8 with the respective apparatus identification 6.

If both the apparatus identification 6 of the apparatus 8 and the identifications 14, 16, 18 associated with each communication-enabled component 12 are detected when an apparatus 8 is installed, the host system 4 is provided with a combination of identifications of the actually installed apparatus 8 by way of the applicable principal dataset, which identifications the host system 4 can compare with the identifications from the reference dataset.

Figure 6:
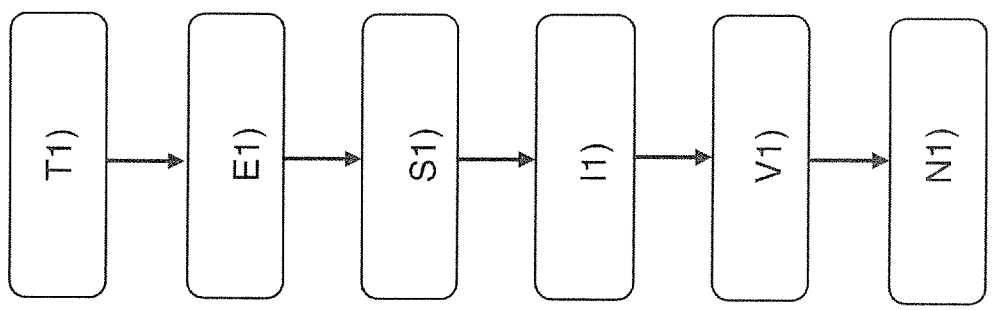

The method according to the invention, as depicted by way of illustration and schematically in the flowchart in FIG. 6, thus initially comprises step T1), according to which a configuration signal is transmitted from the terminal 2 to the host system 4, wherein the configuration signal represents at least one principal dataset. In step E1), this configuration signal is received by means of the host system 4. In step S1), the at least one principal dataset received by means of the configuration signal is stored by the host system 4.

After a principal dataset has been received and stored by the host system 4, step I1) involves the host system being used to identify in the reference dataset the apparatus identification 6 of a respective principal dataset that has been transmitted by means of the configuration signal and to read the at least one related, non-unique reference piece-part identification 16 from the reference dataset. The host system 4 thus initially identifies the apparatus identification 6 of the principal dataset in the multiplicity of apparatus identifications 6 of the reference dataset. If the correct apparatus identification 6 has been identified in the reference dataset, the at least one, related reference piece-part identification 6 is read from the reference dataset by means of the host system and thus determined for the actual apparatus identification 6 of the respective apparatus 8. If the apparatus 8 having an apparatus identification 6 has multiple communication-enabled components 12, then the apparatus identification 6 may also have multiple associated reference identifications that can be determined in step I1) accordingly. The apparatus identification 6 from the principal dataset therefore allows at least one reference piece-part identification to be determined for the related apparatus in step I1).

In step V1), the host system 4 is used to compare the at least one piece-part identification 16 comprised by the at least one auxiliary dataset of the principal dataset with the at least one reference piece-part identification that was identified for the respective apparatus identification 6 of the principal dataset in step I1). The result of the comparison may be, for example, a positive match between the at least one reference piece-part identification and the actual piece-part identification 16. If there are differences, then a non-match may be the result of the comparison.

In step N1), the host system 4 is therefore used to generate and send a report signal that represents the result of the comparison from step V1). The report signal can be transmitted from the host system 4 to the mobile terminal 2 by way of the signal connection 38, for example, as a result of which the display 26 of the mobile terminal 2 is used to output a message that optically represents the result of the comparison. The user of the mobile terminal 2 is therefore provided with information about whether the respective previously installed apparatus 8 comprises the correct components 12. If there is a positive match, the user of the mobile terminal 2 can advance to the next apparatus 8. If there is no match, but rather differences, the user can arrange for the communication-enabled components 12 to be exchanged, as a result of which the incorrect communication-enabled component 12 is replaced with a correct communication-enabled component 12.

Figure 7:
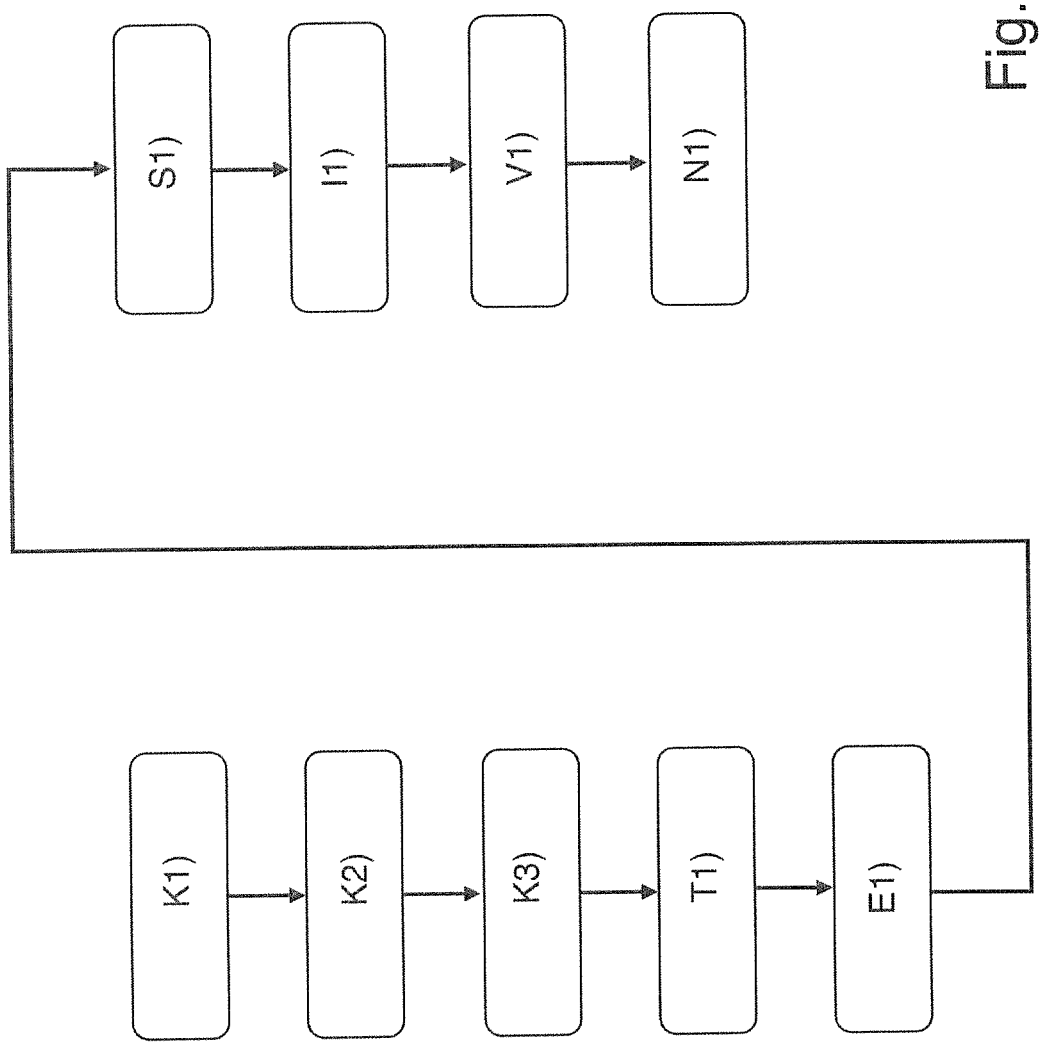

It has already been mentioned above that the mobile terminal 2 may be designed to optically detect the identifications 6, 14, 16, 18. FIG. 7 reproduces a further advantageous configuration of the method by means of a schematic flowchart. The method comprises the steps that have already been explained in connection with FIG. 6. In addition, the method comprises steps K1), K2) and K3). As FIG. 7 shows, there is preferably provision for steps K1), K2) and K3) to be performed in succession. However, it is also possible for steps K1) and K2) to be performed simultaneously or at least at overlapping times. Step K3) is preferably performed when the two steps K1) and K2) have ended. Additionally, there is preferably provision for steps K1), K2) and K3) to be performed before step T1).

According to step K1), an apparatus identification 6 on the apparatus 8 is, directly or indirectly, optically detected by means of the terminal 2. This can be accomplished by using the camera 20. Additionally, this step K1) is advantageous in particular when the apparatus identification 6 is optically represented on an apparatus sticker 34, the apparatus sticker 34 being stuck to an outer side of the apparatus 8.

According to step K2), a subscriber identification 14, a non-unique piece-part identification 16 and an initial key identification 18 on each component 12 of the apparatus 8 from step K1) are, directly or indirectly, optically detected by means of the terminal 2. This can likewise be accomplished by using the camera 20 of the mobile terminal 2. The identifications 14, 16, 18 may be optically represented on a component sticker 36 together, the component sticker 36 being stuck to an outer side of the respective communicative component 12. Each communication-enabled component 12 can have a corresponding component sticker 36 on the outer side. At least the subscriber identifications 14 on the component stickers 36 differ between the communication-enabled components 12. Step K2) can therefore be performed individually for each communication-enabled component 12 of a respective apparatus 8.

According to step K3), the principal dataset is generated for the respective apparatus 8 from the related apparatus identification 6 detected in step K1) and the at least one related auxiliary dataset having the identifications 14, 16, 18 respectively detected in step K2), by means of the mobile terminal 2. If the apparatus 8 comprises for example two mobile components 12, then the principal dataset generated in step K3) comprises not only the apparatus identification 6 of the apparatus 8 but also two auxiliary datasets, each component 12 having precisely one of the two auxiliary datasets uniquely associated with it. The auxiliary datasets can likewise be generated by the mobile terminal 2, specifically from the identifications 14, 16, 18 of the component stickers 36 of the respective component 12. When the principal dataset has been generated in step K3), step T1) can then take place, namely transmitting a configuration signal from the mobile terminal 2 to the host system 4, wherein the configuration signal represents the principal dataset.

FIG. 8 depicts a further, advantageous configuration of the method by means of a schematic flowchart. This configuration of the method comprises the steps that have been explained in connection with FIG. 7, which means that reference is made to the explanations pertaining to FIG. 7 in an analogous manner FIG. 8 shows that, following step N1), two further steps R1) and A1) are performed. According to step R1), which can be performed following step N1), the report signal is received from the host system 4 by means of the signal interface 22 of the terminal 2. As a result, the mobile terminal 2 is provided with the information concerning whether the comparison from step V1) results in a match between the at least one reference piece-part identification and the actual piece-part identification 16 or whether the result of the comparison from step V1) is differences between the at least one reference piece-part identification and the actual piece-part identification 16. According to step A1), which can be performed following step R1), a message is displayed on the display 26 of the terminal 2, wherein the message optically represents the result of the comparison from step V1). The user of the terminal 2 is thus provided, by way of the message displayed on the display 26, with the information about whether the apparatus 8 and the at least one related, communication-enabled component 12 are correctly installed.

The mobile terminal 2 can be used in such a way that each principal dataset is transmitted from the mobile terminal 2 to the host system 4 by way of the configuration signal as soon as the principal dataset has been generated. However, it is also possible for the mobile terminal 2 to be used to generate a multiplicity of principal datasets after the identifications 6, 14, 16, 18 on multiple apparatuses 8 and related, communication-enabled components 12 have been detected. It is therefore possible for precisely one unique related principal dataset to have been generated for each apparatus 8 by the mobile terminal 2. These multiple principal datasets can be transmitted from the mobile terminal 2 to the host system 4 by way of the configuration signal together.

Generation of the principal dataset and detection of the identifications 6, 14, 16, 18 of the apparatus 8 and of the components 12 do not necessarily require a mobile terminal 2, however. This will be explained by way of illustration with reference to FIGS. 4 and 5.

Figure 4:
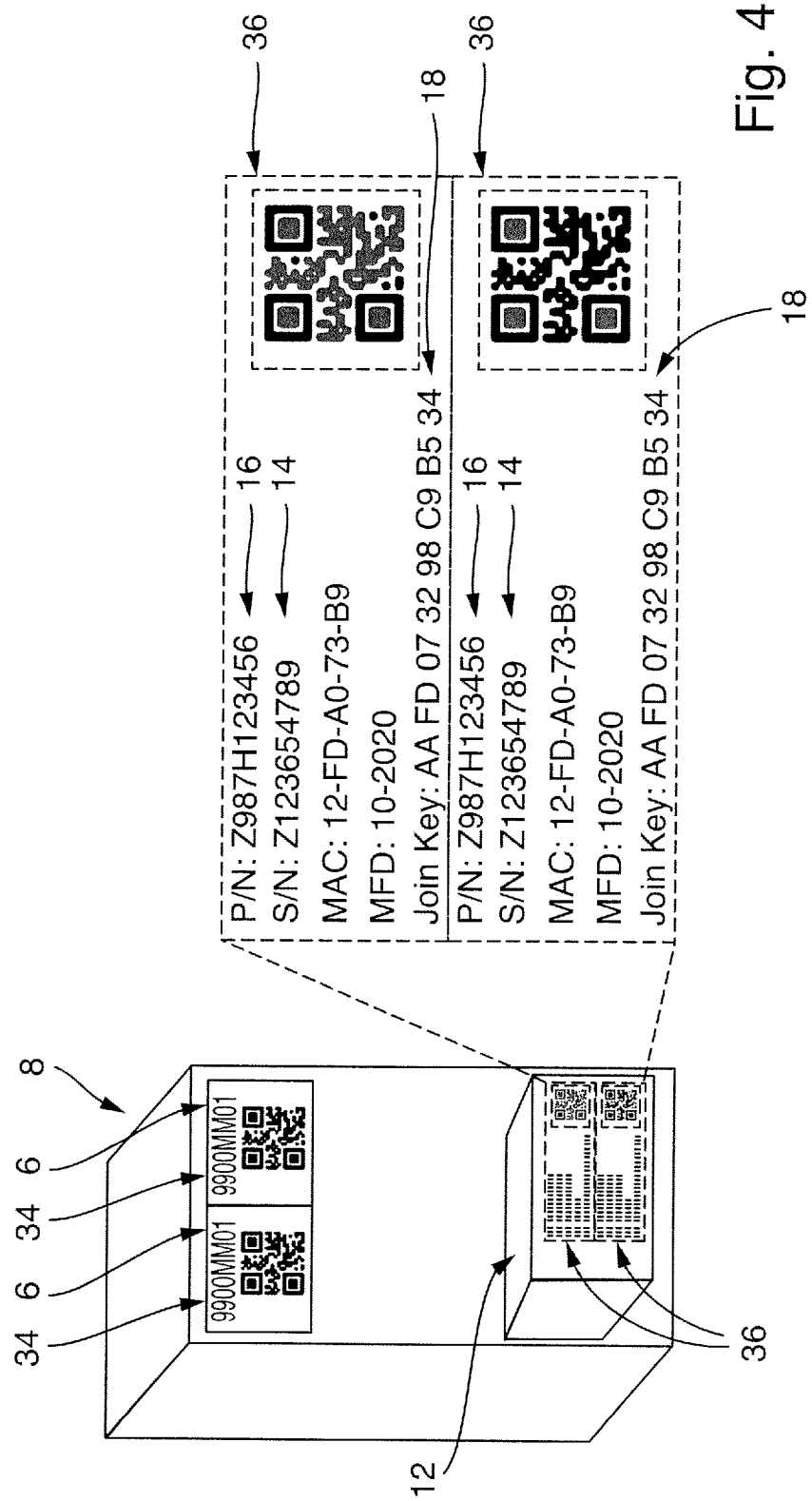
FIG. 4 shows a schematic view of a further advantageous configuration of an apparatus.
Figure 5:
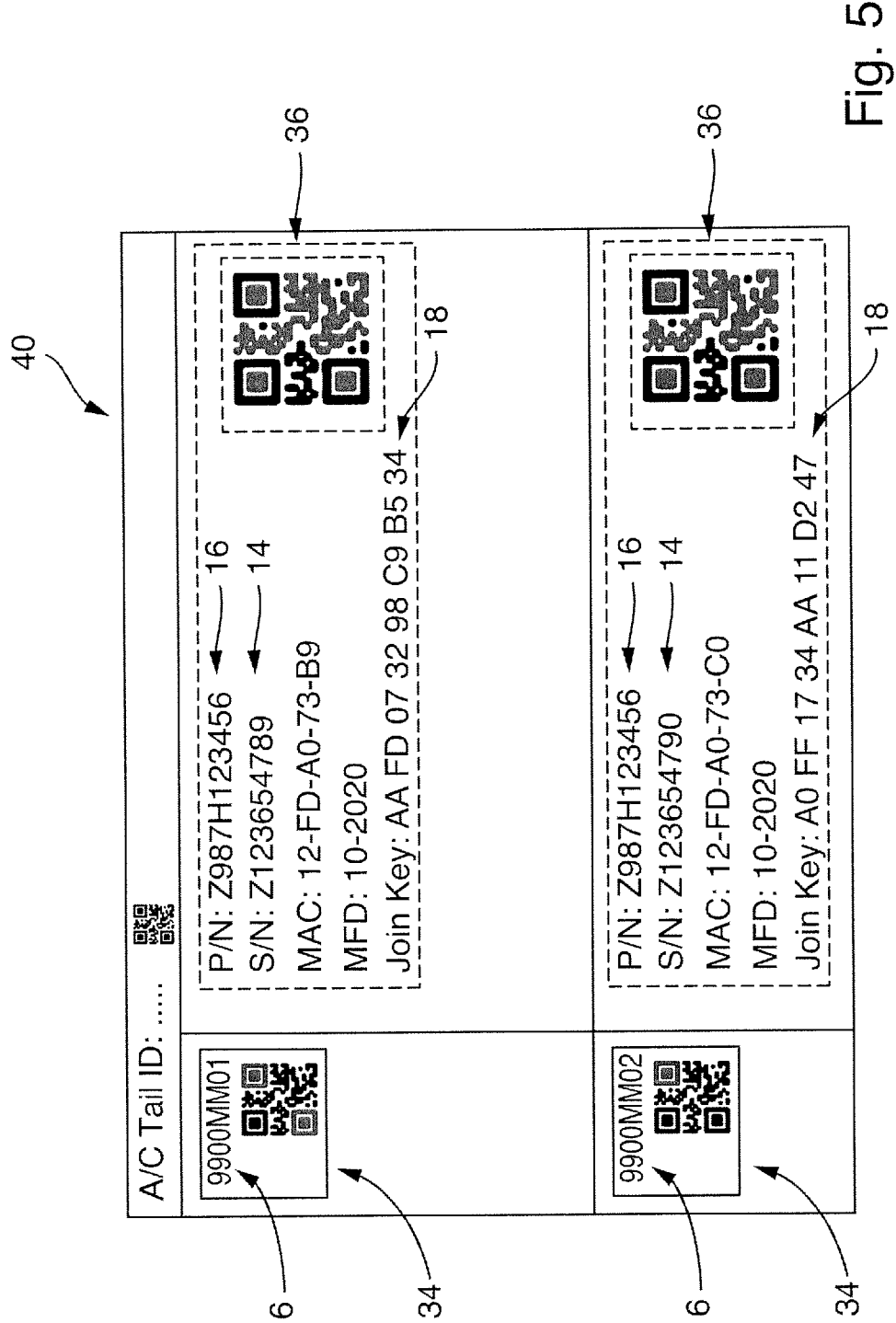
FIG. 5 shows an advantageous configuration of a sheet of paper with identifications arranged in tabular fashion.

FIG. 4 schematically depicts an apparatus 8 that has precisely one communication-enabled component 12. The outer side of the apparatus 8 has had two identical apparatus stickers 34 applied to it, each of which represents the same apparatus identification 6 in plain text or by means of a QR code. The outer side of the component 12 has additionally had two identical component stickers 36 attached to it, each of which represents the same subscriber identification 14, the same non-unique piece-part identification 16 and the same initial key identification 18 in plain text or by means of a QR code. One of the apparatus stickers 34 can be removed and stuck to a sheet of paper 40 that is schematically depicted in FIG. 5, for example. This sheet of paper 40 may have been divided in tabular fashion. The apparatus sticker 34 may be arranged in a left-hand column. The sheet 40 has provision for two rows, as a result of which a further apparatus sticker 34 of another apparatus 8 (not depicted) has been stuck in the second row. The apparatus sticker 34 of the apparatus 8 from FIG. 4 has been stuck in the first row. One of the component stickers 36 of the component 12 of the apparatus 8, which has previously been removed from the component 12, has been stuck to the right of the apparatus sticker 34 in the same row. By sticking the apparatus stickers 34 and the component stickers 36 in this way, an association can be made between the apparatus identification 6 and the identifications 14, 16, 18 of the respective component 12 of the apparatus 8 to which the apparatus identification 6 relates. If the apparatus 8 has multiple components 12, then multiple component stickers 36 of the different components 12 can be stuck in the same row, each component sticker 36 providing identifications 14, 16, 18 for an auxiliary dataset associated with the respective component 12. The sheet 40 depicted in FIG. 5 can be scanned in by a fixed terminal 2 having a related scanner. The fixed terminal 2 may be designed to generate a principal dataset for each apparatus 8, as a result of which each principal dataset has an apparatus identification 6 determined by the respective apparatus sticker 34, and comprises, for each component 12, a related auxiliary dataset reproduced by the identifications 14, 16, 18 on the component sticker 36 that is arranged in the same row as the apparatus sticker 34 having the apparatus identification 6 for the respective principal dataset. By scanning the sheet 40 that is depicted on page 5, for example, it is possible for multiple principal datasets to be generated and transmitted to the host system 4 by way of a signal connection 38 by means of a configuration signal that is generated by the fixed terminal 2.

It will additionally be pointed out that "having" is not exclusive of other elements or steps and "a" or "an" is not exclusive of a multiplicity. Furthermore, it will be pointed out that features that have been described with reference to one of the exemplary embodiments above can also be used in combination with other features of other exemplary embodiments described above. Reference signs in the claims should not be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 2 terminal
4 host system
6 apparatus identification
8 apparatus
10 aircraft
12 component
14 subscriber identification
16 piece-part identification
18 initial key identification
20 camera
22 first signal interface
24 second signal interface
26 display
30 fuselage
32 galley
34 apparatus sticker
36 component sticker
38 signal connection
40 sheet

The invention claimed is:

1. A method, comprising the steps of:
T1) transmitting a configuration signal from a terminal to a host system, wherein the configuration signal represents at least one principal dataset,
wherein each of the at least one principal dataset represents precisely one related, unique apparatus identification of a respective apparatus of an aircraft, wherein the respective apparatus comprises a structure within an interior of the aircraft, and wherein each of the at least one principal dataset comprises, for the respective apparatus, at least one auxiliary dataset, which, in each case, corresponds to precisely one component of the respective apparatus,
wherein each of the at least one auxiliary dataset comprises:
a related, unique subscriber identification of the respective component,
a non-unique piece-part identification of the respective component, and
an initial key identification;
S1) storing, in the host system, a reference dataset that comprises a multiplicity of the unique apparatus identifications and at least one associated, non-unique reference piece-part identification for each of the unique apparatus identifications;
E1) receiving the configuration signal by means of the host system;
S2) storing, in the host system, the at least one principal dataset received by means of the configuration signal;
I1) Identifying in the reference dataset, by means of the host system, the unique apparatus identification of each of the at least one principal dataset received by means of the configuration signal;
I2) Determining in the reference dataset, by means of the host system, the at least one non-unique reference piece-part identification related to the identified unique apparatus identification identified in step I1);
V1) comparing the at least one non-unique piece-part identification within the at least one auxiliary dataset of one of the at least one principal dataset with the at least one non-unique reference piece-part identification that was identified for the respective unique apparatus identification of the respective principal dataset in step I1), by means of the host system;
N1) generating and sending a report signal by means of the host system, as a result of which the report signal represents a result of the comparing from step V1); and
U1) repairing or producing the aircraft based on the report signal.

2. The method according to claim 1, wherein in step V1) the host system is used to check whether the non-unique piece-part identifications and non-unique reference piece-part identifications to be compared with one another match, and the report signal is generated by means of the host system in step N1) in such a way that the result represents a positive match if the check from step V1) shows no differences, and if no positive match, indicates the non-unique piece-part identifications and non-unique reference piece-part identifications by means of the report signal.

3. The method according to claim 1, wherein the configuration signal represents of the multiple principal datasets.

4. The method according to claim 1, wherein the terminal is a fixed terminal having a paper scanner.

5. The method according to claim 1, wherein the terminal is a mobile terminal.

6. The method according to claim 5, wherein the mobile terminal has a camera, the method additionally comprising the following steps K1), K2) and K3), which are performed before step T1):
K1) directly or indirectly, optically detecting the apparatus identification on the apparatus by means of the terminal;
K2) directly or indirectly, optically detecting the subscriber identification, the non-unique piece-part identification and the initial key identification on each component of the apparatus from step K1) by means of the terminal; and
K3) generating the principal dataset for each apparatus from the apparatus identification detected in step K1) and the at least one related auxiliary dataset with the non-unique piece-part identification and the initial key identification detected in step K2), by means of the terminal.

7. The method according to claim 5, wherein the mobile terminal has a near-field reader, the method additionally comprising the following steps K1), K2) and K3), which are performed before step T1):
K1) directly or indirectly, electromagnetically detecting the apparatus identification on the apparatus by means of the terminal; and
K2) directly or indirectly, electromagnetically detecting the subscriber identification, the non-unique piece-part identification and the initial key identification on each component of the apparatus from step K1) by means of the terminal;
K3) generating the principal dataset for each apparatus from the apparatus identification detected in step K1) and the at least one related auxiliary dataset with the non-unique piece-part identification and the initial key identification detected in step K2), by means of the terminal.

8. The method according to claim 5, wherein in step T1) at least one principal dataset is transmitted from the terminal to the host system in each of multiple, successive time windows.

9. The method according to claim 1, wherein the terminal has a first signal interface and the host system has a second signal interface, the first signal interface and the second signal interface being configured to transmit a signal.

10. The method according to claim 9, wherein the terminal has a display and the first signal interface is configured to receive the report signal, and wherein the method comprises the following steps:
R1) receiving the report signal by means of the first signal interface of the terminal; and
A1) displaying a message, which optically represents a result of the comparison from step V1), based on the report signal and by means of the display of the terminal.

11. The method according to claim 9, wherein the first interface and the second interface are each formed as a radio interface, the configuration signal being transmitted as a radio configuration signal in step T1), and the report signal being sent as a radio report signal in step N1).

12. The method according to claim 11, wherein the method additionally comprises the following steps H1), Z1) and W1):
H1) making a radio signal connection from a third radio signal interface of a component of an apparatus of an aircraft to the second radio signal interface of the host system, wherein a memory unit of the respective component stores the related, unique subscriber identification of the respective component, a non-unique piece-part identification of the respective component and an initial key identification, and wherein the radio signal connection is encrypted by means of the initial key identification;
Z1) assigning and transmitting a new key identification from the host system to the component by way of the radio signal connection; and
W1) remaking a new radio signal connection, encrypted by means of the new key identification, from the third radio signal interface of the component to the second radio signal interface of the host system.

13. The method according to claim 12, wherein the method additionally comprises the following steps:
R1) receiving a reset signal by way of the third radio signal interface of the component or a pushbutton switch of the component, and
R2) resetting the new key identification to the initial key identification stored in the memory unit of the component.

14. The method according to claim 1, wherein the respective apparatus comprises a seat from a passenger area of the aircraft, a cabinet from a galley of the aircraft, or a subassembly from the toilet area of the aircraft.

15. A method, comprising the steps of:
T1) transmitting a configuration signal from a terminal to a host system, wherein the configuration signal represents at least one principal dataset, wherein communication between the terminal and the host system is encrypted with an initial key identification,
wherein each of the at least one principal dataset represents precisely one related, unique apparatus identification of a respective apparatus of an aircraft and comprises, for the respective apparatus, at least one auxiliary dataset, which, in each case, corresponds to precisely one component of the respective apparatus,
wherein each of the at least one auxiliary dataset comprises:
a related, unique subscriber identification of the respective component,
a non-unique piece-part identification of the respective component, and
the initial key identification;

S1) storing, in the host system, a reference dataset that comprises a multiplicity of the unique apparatus identifications and at least one associated, non-unique reference piece-part identification for each of the unique apparatus identifications;
E1) receiving the configuration signal by means of the host system;
S2) storing, in the host system, the at least one principal dataset received by means of the configuration signal;
I1) Identifying in the reference dataset, by means of the host system, the unique apparatus identification of each of the at least one principal dataset received by means of the configuration signal;
I2. Determining in the reference dataset, by means of the host system, the at least one non-unique reference piece-part identification related to the identified unique apparatus identification identified in step I1);
V1) comparing the at least one non-unique piece-part identification within the at least one auxiliary dataset of one of the at least one principal dataset with the at least one non-unique reference piece-part identification that was identified for the respective unique apparatus identification of the respective principal dataset in step I1), by means of the host system;
N1) generating and sending a report signal by means of the host system, as a result of which the report signal represents a result of the comparing from step V1);
H1) making a signal connection from a component of an apparatus of the aircraft to the host system, wherein the memory unit of the respective component stores the related, unique subscriber identification of the respective component, the non-unique piece-part identification of the respective component and the initial key identification, and wherein the signal connection is encrypted by means of the initial key identification;
Z1) assigning and transmitting a new key identification which is a unique key identification associated only with the respective component from the host system to the component; and
W1) remaking a new signal connection, encrypted by means of the new key identification, from the component to the host system.

16. The method according to claim 15, wherein the initial key identification is one of a certificate, a digital key, or an access key for the encrypted communication.

17. A method, comprising the steps of:
T1) transmitting a configuration signal from a terminal to a host system, wherein the configuration signal represents at least one principal dataset, wherein the terminal has a first signal interface and the host system has a second signal interface, the first signal interface and the second signal interface being configured to transmit a signal, wherein the first interface and the second interface are each formed as a radio interface, the configuration signal being transmitted as a radio configuration signal,
wherein each of the at least one principal dataset represents precisely one related, unique apparatus identification of a respective apparatus of an aircraft and comprises, for the respective apparatus, at least one auxiliary dataset, which, in each case, corresponds to precisely one component of the respective apparatus,
wherein each of the at least one auxiliary dataset comprises:
a related, unique subscriber identification of the respective component, a non-unique piece-part identification of the respective component, and an initial key identification;

S1) storing, in the host system, a reference dataset that comprises a multiplicity of the unique apparatus identifications and at least one associated, non-unique reference piece-part identification for each of the unique apparatus identifications;

E1) receiving the configuration signal by means of the host system;

S2) storing, in the host system, the at least one principal dataset received by means of the configuration signal;

I1) identifying in the reference dataset, by means of the host system, the unique apparatus identification of each of the at least one principal dataset received by means of the configuration signal;

I2) Determining in the reference dataset, by means of the host system, the at least one non-unique reference piece-part identification related to the identified unique apparatus identification identified in step I1);

V1) comparing the at least one non-unique piece-part identification within the at least one auxiliary dataset of one of the at least one principal dataset with the at least one non-unique reference piece-part identification that was identified for the respective unique apparatus identification of the respective principal dataset in step I1), by means of the host system;

N1) generating and sending a report signal by means of the host system, as a result of which the report signal represents a result of the comparing from step V1), the report signal being sent as a radio report signal;

H1) making a radio signal connection from a third radio signal interface of a component of an apparatus of an aircraft to the second radio signal interface of the host system, wherein a memory unit of the respective component stores the related, unique subscriber identification of the respective component, a non-unique piece-part identification of the respective component and an initial key identification, and wherein the radio signal connection is encrypted by means of the initial key identification;

Z1) assigning and transmitting a new key identification from the host system to the component by way of the radio signal connection; and W1) remaking a new radio signal connection, encrypted by means of the new key identification, from the third radio signal interface of the component to the second radio signal interface of the host system.

18. The method according to claim 17, wherein the method additionally comprises the following steps:

R1) receiving a reset signal by way of the third radio signal interface of the component or a pushbutton switch of the component, and R2) resetting the new key identification to the initial key identification stored in the memory unit of the component.

* * * * *